United States Patent Office 3,386,888
Patented June 4, 1968

3,386,888
RESOLUTION OF RACEMIC AMINO ACIDS
Ichiro Chibata, Toyonaka-shi, and Tetsuya Tosa and Noriko Endo, Kyoto-shi, Japan, assignors to Tanabe Seiyaku Co., Ltd., Higashi-ku, Osaka, Japan, a corporation of Japan
No Drawing. Filed July 15, 1965, Ser. No. 472,324
7 Claims. (Cl. 195—2)

ABSTRACT OF THE DISCLOSURE

Racemic amino acids are resolved into an optically active component by contacting a solution of an alpha-N-acyl derivative of the racemate with an acylase complexed with a polysaccharide anion exchanger to form free L-amino acid.

---

This invention relates to a method for resolving racemic or optically inactive amino acids, wherein acylamino acids are asymmetrically hydrolyzed, and more particularly for recovering optically active constituents.

The prior art has recognized that acylase from molds such as *Aspergillus oryzae* has the ability to hydrolyze the L-isomer of an acylamino acid into the free L-amino acid selectively, while the other D-isomer remains unhydrolyzed when two enantiomorphs are incubated with said enzyme in an aqueous solution. Thus the racemic amino acid can be resolved by the enzymatic reaction. After the hydrolysis has been completed, the reaction solution is boiled or acidified to precipitate the enzyme, and then the precipitate is filtered off. From the filtrate, the portion of the amino acids which is in the free form and the portion which is in the acylated form are separated from one another by means of the difference of their solubilities. However, the enzyme can be used only once and must be discarded thereafter. Furthermore, the recovery of the amino acid produced necessarily requires an additional step to remove the enzyme and its contaminants from the product.

The present invention is intended and adapted to overcome the disadvantages inherent in the prior methods, it being among the objects of the invention to provide a method of resolving racemic amino acids by the use of acylases which will obviate the necessity of the discarding the enzyme but will allow reuse thereof in a number of successive operations.

It is also among the objects of the present invention to provide a process which is simple and in which optically active L-isomer is produced with high yields.

It is further among the objects of the invention to provide a process which eliminates the necessity for additional steps to separate the desired product from the substances present in the reaction mixture and particularly from the enzyme itself.

The invention is based primarily upon the discovery that when the resolving is conducted in the presence of an anion exchange polysaccharide, the L-isomer is electively hydrolyzed into the free amino acid. The resulting free L-amino acid and the N-acyl-D amino acid may then be readily separated from each other.

Suitable for use in the present process are those anion exchange polysaccharides which are the derivatives of polysaccharide such as cellulose, dextran or starch having various ionizable groups in the molecule. They are well-known to biochemists as adsorbents for use in purifying or separating many biochemical substances, and are commercially available under various trade names such as "DEAE-Sephadex" (diethylaminoethyl-dextran), "DAEA-cellulose" (diethylamino-ethyl-cellulose), "TEAE-cellulose" (triethylamino-cellulose), "ECTEOLA-cellulose" (a reaction product of alkali cellulose with epichlorhydrin and triethanolamine) and others.

The acylase preparation to be employed for this invention may be prepared by charging one of said adsorbents into a tube to form a column and passing an aqueous solution of acylase through the column at a suitable flow rate, thereby acylase is adsorbed on the adsorbent in a water-insoluble form. Alternatively, the adsorbent is added to the solution and the mixture is stirred for several hours. The resulting adsorbent is collected by filtration or centrifugation.

As the source of acylase, we prefer to use enzyme preparations containing acylase obtained from microorganisms such as *Aspergillus oryzae*, *Aspergillus meleus*, *Aspergillus nidulans*, *Penicillium vinaceum* or *Penicillium corymbiferum*. They may be used in preparing the water-insoluble enzyme preparation of the abovementioned procedure after dissolving in water.

Aqueous solutions containing acylase may be directly prepared by cultivating one of said microorganisms in an aqueous medium and filtering the resulting culture. Furthermore, it has been found that the solution may be also prepared by inoculating one of said microorganisms on a wheat-bran medium which has been preliminarily autoclaved, incubating the mixture at a suitable condition and extracting the resulting culture with water.

Acylase solutions containing various impurities such as proteinous impurities and coloring matters may be employed, because such impurities can be readily removed from the adsorbent by subsequent washing with water.

Many N-acyl derivatives of racemic amino acids are employed for the present invention as a substrate or starting material. Examples of said N-acyl amino acids are as follows; alpha-N-acetyl-amino acids, such as N - acetyl - analine, N - acetyl - valine, N-acetyl-leucine, N-acetyl-isoleucine, N-acetyl-serine, N-acetyl-threonine, N-acetyl-cysteine, N-acetyl-methionine, N-acetyl-phenylalanine, N - acetyl - tyrosine, N - acetyl - aspartic acid, N-acetyl-glutamic acid, alpha-N-acetyl-histidine, alpha, epsilon-N,N'-diacetyl-lysine, alpha, delta-N,N'-diacetyl-ornithine, and alpha-N-acetyl-epsilon-N-benzoyl-lysine. Other acyl derivatives, such as N-formyl, N-chloroacetyl, N-bromoacetyl, N-propionyl, N-butyryl or N-benzoyl derivatives of alpha-amino acid are also empleyod.

In a preferred embodiment of thisi nvention, racemate of an N-acyl amino acid is dissolved in water at a concentration of 0.1 M to 0.25 M. The solution is then adjusted at a pH 5.0 to 9.0. After adding the aforementioned water-insoluble enzyme preparation, the mixture is incubated at a temperature of 30° to 70° C. with stirring for a sufficient length of time to complete the reaction. It is advantageous to incorporate a small amount of cobalt (II) ion into the substrate solution as an activator. After the reaction is completed, the mixture is filtered to recover the insoluble enzyme for subsequent use. The L-isomer which is in the form of free amino acid may be recovered from the filtrate.

The heat stability of the enzyme both in its water-insoluble complex form and in its free form were compared by heating it at 65° to 80° C. for 5 to 15 minutes. Table I shows the percentages of residual acylase activity both in the form of the insoluble complex and the free enzyme. As will be seen from Table I, the former is more stable than the latter.

TABLE I

| Temperature (° C.) | Heating time (min.) | Remaining percentage of acylase activity | |
|---|---|---|---|
| | | Insoluble acylase complex | Unadsorbed acylase solution |
| 65 | 5 | 100 | 75.2 |
| | 10 | 88.2 | 64.0 |
| | 15 | 87.3 | 52.0 |
| 70 | 5 | 92.4 | 25.2 |
| | 10 | 78.3 | 10.0 |
| | 15 | 61.0 | 6.0 |
| 75 | 5 | 29.0 | 1.2 |
| | 10 | 22.0 | 1.2 |
| | 15 | 7.0 | 0 |
| 80 | 5 | 11.3 | 0 |
| | 10 | 9.3 | 0 |
| | 15 | 2.8 | 0 |

The resulting D-isomer which is in the form of acyl amino acid may be hydrolysed into the free D-amino acid. However, the acylated D-enantiomorph is usually racemized for further resolution because most a D-amino acids are biologically of no value.

In the examples, the activity of each of the enzyme preparation is shown by "unit" as described in the "Report of the Commission on Enzymes of the International Union of Biochemistry (1961)," so that the activity by "unit" represents the numbers of micromoles of the substrate which has been hydrolysed by the action of the enzyme in one minute, when it is measured by any one of the following methods:

(1) Free enzyme.—The substrate solution comprises;

| | Ml. |
|---|---|
| 0.2 M solution of N-acetyl-DL-methionine (pH 7.0) | 0.5 |
| $3 \times 10^{-3}$ M solution of $CoCl_2$ | 0.5 |
| 0.1 M phosphate buffer solution (pH 7.0) | 1.0 |

To this solution, 1.0 ml. of acylase solution is added and the mixture is incubated for 30 minutes at 37° C. The quantity of free L-methionine formed is assayed colorimetrically by the ninhydrin method.

(2) Insoluble enzyme in batch method.—The substrate solution comprises;

| | Ml. |
|---|---|
| $2/15$ M solution of N-acetyl-DL-methionine (pH 7.0) | 5.0 |
| $1/15$ M phosphate buffer solution (pH 7.0) | 10.0 |
| $2 \times 10^{-3}$ M solution of $CoCl_2$ | 5.0 |

To the solution, 10 mg. to 40 mg. of insoluble enzyme solution is added and the mixture is incubated for 30 minutes at 37° C. with stirring. After filtering the mixture, L-methionine is assayed by the same manner as described above.

(3) Insoluble enzyme in flow method.—The substrate solution contains acetyl-DL-methionine at a concentration of 0.05 M and $CoCl_2$ at a concentration of $5 \times 10^{-4}$ M (pH 7.0). The substrate solution is passed through a column of the insoluble enzyme at a space velocity of 5 me./ml., hr. at 37° C. L-methionine in the effluent is assayed by the same manner as described above.

In order to illustrate the nature of the present invention there are submitted below a number of examples of the operation thereof:

Example 1

50 g. of a solid-culture prepared by the cultivation of *Aspergillus oryzae* on steamed wheat-bran was stirred into 500 ml. of water for 2 hours and filtered, whereby 450 ml. of the enzyme solution of 0.33 unit/ml. was obtained. The solution was passed through a column of 30 ml. of DEAE-cellulose (OH type, exchange capacity 0.88 meq./g.) charged in a glass tube of 2 cm. x 9.5 cm. at a flow rate of 75 ml. per hour at 5° C. The column was washed with water. The enzyme was adsorbed on the adsorbent as a water-insoluble complex (Acylase activity 46.2 unit/column).

345.6 g. of N-acetyl-DL-methionine was dissolved in 900 ml. of 2 N sodium hydroxide. After 1071 mg. of cobalt (II) chloride hexahydrate was added, the solution was diluted with water until the volume became 9 liters. The solution (pH 7.0, 0.2 M concentration of N-acetyl-DL-methionine and $5 \times 10^{-4}$ M concentration of cobalt ion) was continuously passed through the abovementioned column at 37° C. at flow rates of 40 ml./hr. and of 20 ml./hr. The concentration of L-methionine in the effluent was assayed colorimetrically by the ninhydrin method from samples obtained at intervals, and the conversion rate of N-acetyl-DL-methionine to L-methionine was calculated therefrom.

The results are tabulated in Table II, which shows a remarkable durability of the insoluble complex of the enzyme.

TABLE II

| | Conversion rates to L-methionine (percent) | |
|---|---|---|
| Flow rate Time (hrs.): | 40 (ml./hr.) | 20 (ml./hr.) |
| 2 | 69.3 | 100 |
| 21 | 69.8 | 100 |
| 48 | 68.9 | 100 |
| 75 | 69.2 | 100 |
| 96 | 69.4 | 100 |
| 120 | 68.8 | 100 |
| 130 | 69.6 | 100 |

Example 2

The same acylase solution as employed in Example 1 was passed through a column of 6 ml. of DEAE-cellulose (OH type, exchange capacity 0.53 meq./g.) charged in a glass tube of 0.9 cm. x 9.5 cm. at a flow of 75 ml./hr. and the column was washed with a large quantity of water. The enzyme was adsorbed in the form of an insoluble DEAE-cellulose-acylase complex. (Acylase activity 4.0 unit/column).

An aqueous solution containing 0.25 M concentration of N-acetyl-DL-methionine and $5 \times 10^{-4}$ M concentration of cobalt (II) ion (pH 7.0) was passed through the column at a flow rate of 7.5 ml./hr. at each of the temperatures tabulated in Table III. The conversion rate to L-methionine in each case was calculated. The results obtained are as follows:

TABLE III

| Temperature (° C.) | 37 | 42 | 47 | 52 | 57 | 62 | 67 |
|---|---|---|---|---|---|---|---|
| Conversion rates to L-methionine (percent) | 31.2 | 41.0 | 57.1 | 65.5 | 75.2 | 81.8 | 86.6 |

Example 3

An aqueous solution containing 0.05 M concentration of N-acetyl-DL-methionine and $5 \times 10^{-4}$ M concentration of cobalt (II) ion was adjusted at a pH of 7.0. The solution was passed through the same column as used in Example 1 at 37° C. at a flow rate as tabulated in Table IV.

The conversion rate of N-acetyl-DL-methionine to L-methionine was calculated by the same method as described in the foregoing examples.

The above procedure was repeated with the exception that each of the other alpha-N-acyl-DL-amino acids which are shown in Table IV was used instead of N-acetyl-DL-methionine.

The results are shown in the Table IV.

TABLE IV

| Alpha-N-acetyl-DL-amino acids | Concentration (Mol/l.) | Conversion rates to L-alpha-amino acid (percent) | | | |
|---|---|---|---|---|---|
| | | L-amino acids formed | Flow rate (ml./hr.) | | |
| | | | 30 | 15 | 7.5 |
| N-acetyl-DL-methionine | 0.05 | L-methionine | 52.1 | 88.9 | 100 |
| N-acetyl-DL-phenylalanine | 0.05 | L-phenylalanine | 47.3 | 81.6 | 100 |
| N-acetyl-DL-tryptophan | 0.05 | L-tryptophan | 45.6 | 74.8 | 100 |
| N-acetyl-DL-valine | 0.05 | L-valine | 55.1 | 86.7 | 100 |
| ε-N-benzoyl-α-N-acetyl-DL-lysine | 0.02 | ε-N-benzoyl-L-lysine | 98.0 | 100 | |

Example 4

33.3 mg. of an acylase preparation (620 unit/g.) obtained from *Aspergillus oryzae* was dissolved in 3 ml. of water. The solution was passed through a column of 10 ml. of DEAE-Sephadex (A-50, OH type) charged in a glass tube of 1.0 cm. x 12.7 cm. The column was washed with a large amount of water. The enzyme was adsorbed on the adsorbent as an insoluble complex (column No. 1, acylase activity 7.1 unit/column).

On the other hand, 20 mg. of an acylase preparation (570 unit/g.) obtained from *Penicillium vihaceum* was dissolved in 3 ml. of water. The solution was passed through a column of 6 ml. of DEAE-cellulose (OH type) charged in a glass tube of 0.9 cm x 9.5 cm. The column was washed with a large amount of water to give a complex (column No. 2 acylase activity 1.1 unit/column).

An aqueous solution containing N-acetyl-DL-methionine and cobalt (II) ion at concentrations of 0.2 M and $5 \times 10^{-4}$, respectively (pH. 7.0), was passed through the column No. 1 at a flow rate as tabulated in Table IV at 37° C. Similarly, an aqueous solution containing N-acetyl-DL-methionine and cobalt (II) ion at concentration of 0.05 M and $5 \times 10^{-4}$, respectively, was passed through the column No. 2 under the same conditions as described above. The conversion rate to L-methionine in each case is shown in Table V.

TABLE V

| Enzyme Preparation | Concentration of N-acetyl-DL-methionine (Mol/l.) | Flow rate (ml./hr.) | | | | |
|---|---|---|---|---|---|---|
| | | 30 | 15 | 7.5 | 3 | 2 |
| | | Conversion rate (percent) | | | | |
| (I) | 0.2 | 20.3 | 38.4 | 65.3 | 100 | |
| (II) | 0.05 | 9.4 | 18.6 | 35.1 | | 98.5 |

Example 5

50 g. of a solid culture prepared by the cultivation of *Aspergillus oryzae* on a solid medium comprising wheat-bran and rice-hulls was extracted with 500 ml. of water for 2 hours. The resulting 450 ml. of the extract was passed through a column of 30 ml. of DEAE-cellulose (OH type) in a glass tube of 2 cm. x 9.6 cm. at a flow rate of 75 ml./hr. The column was washed with a large amount of water to give the insoluble complex. (Acylase activity 46.2 unit/column).

114.2 g. of N-acetyl-DL-methionine, and 357 mg. of cobalt (II) chloride hexahydrate were dissolved in 2 N sodium hydroxide to give a solution (pH 7.0). The solution was passed through the foregoing column at 37° C. at a flow rate of 20 ml./hr. The effluent was collected and was concentrated under reduced pressure into about one fifth of its original volume, whereby the major part of the L-methionine was crystallized out. After filtering off the crystals, the mother liquor was evaporated to dryness. A quantity of ethanol was added to the residue to extract the portion of acetyl-D-methionine and the remaining crystals were collected by filtration: Both crystals were combined and recrystallized from aqueous methanol, whereby 40.8 g. of L-methionine which decomposes at 279°–281° C. was obtained.

$$[\alpha]_D^{25} = +23.4° (C=3, \text{ in } N\text{—HCl})$$

The ethanol-extract in the foregoing step was evaporated to dryness and the residue was dissolved in 100 ml. of water. The solution was passed through a column of cation-exchange resin of sulfonic acid-type at a flow rate of 200 ml./hr. The resin was washed with a small amount of water. The effluent and washings were combined and were evaporated to dryness. The residue was recrystallized from water, whereby 50.6 g. of N-acetyl-D-methionine melting at 104° was obtained.

$$[\alpha]_D^{25} = +19.6° (C=3, \text{ in water})$$

9.6 g. of this compound was refluxed in 85 ml. of 2 N hydrochloric acid for 2 hours. The reaction mixture was evaporated to dryness. The residue was neutralized to pH 5.5 with 2 N sodium hydroxide and recrystallized from aqueous ethanol, whereby 5.3 g. of D-methionine decomposing at 280°–281° C. was obtained.

$$[\alpha]_D^{25} = -23.4° (C=3, \text{ in } N\text{—HCl})$$

Example 6

82.9 g. of N-acetyl-DL-phenylalanine was dissolved in 200 ml. of 2 N sodium hydroxide. 238 mg. of cobalt (II) chloride hexahydrate was added to the solution and the solution was diluted with water to a total volume of 2 liters. The solution was passed through the same column as employed in Example 5 at a flow rate of 15 ml. per hour at 37° C.

The effluent was concentrated into about one fifth in its original volume, whereby the major part of the L-phenylalanine was crystallized out. The crystals were collected by filtration and the mother liquor was evaporated to dryness. A quantity of ethanol was added to the residue to extract the acetyl-D-phenylalanine and the remaining crystals were filtered off. Both crystals were combined and recrystallized from water whereby 29.6 g. of L-phenylalanine decomposing at 280°–282° C. was obtained.

$$[\alpha]_D^{27} = -34.4° (C=1, \text{ in water})$$

The ethanol extract in the foregoing step was evaporated to dryness and the residue was recrystallized from dilute hydrochloric acid. The resulting crystals were recrystallized from water, whereby 37.4 g. of N-acetyl-D-phenylalanine melting at 170° C. was obtained.

$$[\alpha]_D^{27} = -50.5° (C=1, \text{ in absolute ethanol})$$

10.4 g. of this compound was hydrolyzed and crystallized in the same manner as described in Example 5, whereby 6.4 g. of D-phenylalanine decomposing at 283°–284° C. was obtained.

$$[\alpha]_D^{27} = +34.9° (C=1, \text{ in water})$$

Example 7

30 ml. of DEAE-cellulose (OH type) was added to 350 ml. of the enzyme solution as same as was used in Example 1. The mixture was stirred for 10 hours under cooling and then filtered. The resulting filter-cake was thoroughly washed with water, whereby a water-insoluble DEAE-cellulose acylase complex was obtained. (Acylase activity 20.6 unit/g. in dry basis).

8.29 g. of N-acetyl-DL-phenylalanine was dissolved in 20 ml. of 2 N sodium hydroxide. After 24 mg. of cobalt (II) chloride hexahydrate was dissolved, the solution was diluted to the total volume of 200 ml. The foregoing enzyme complex was added to the solution. The mixture was incubated at 37° C. for 24 hours with stirring. 2.82 g. of L-phenylalanine and 3.61 g. of N-acetyl-D-phenylalanine were obtained from the reaction mixture by repeating the same procedure as described in Example 6. In the course of the reaction the conversion rate to L-phenylalanine was measured. The result obtained is as follows:

TABLE VI

| Incubation time (hr.) | 4 | 7 | 24 |
|---|---|---|---|
| Conversion rates to L-phenylalanine (percent) | 42.4 | 63.4 | 100 |

Although the invention has been described by the use of a number of specific examples, the invention is not limited to the details of the procedure as many changes and variations in the process may be made. In view thereof, the invention is to be broadly construed and not to be limited except by the character of the claims appended hereto.

What is claimed is:

1. A method for resolving a racemic amino acid into an optically active component which comprises providing an anion exchange polysaccharide adsorbent, introducing a mold acylase into said polysaccharide to form a substantially insoluble complex, providing a solution of an alpha-N-acyl derivative of the racemic amino acid, incubating said solution in the presence of said acylase complex to form free L-amino acid.

2. A method according to claim 1 characterized in that said solution flows substantially continuously in contact with said complex.

3. A method for resolving a racemic amino acid which comprises dissolving alpha-N-acyl derivative of the racemic amino acid in an aqueous medium, continuous flowing the resulting solution through a column of mold acylase adsorbed in substantially water-insoluble form on an anion-exchange polysacchardie adsorbent and, separating the resulting free L-amino acid and the adpha-N-acyl-D-amino acid in the effluent from each other.

4. A method according to claim 1 characterized in that said anion-exchange polysaccharide adsorbent is selected from the group consisting of diethylaminoethyl-dextran, diethyl-aminoethyl-cellulose, triethylaminoethyl-cellulose, and the reaction product of unknown structure resulted from the reaction of alkali cellulose with epichlorhydrin and triethanolamine.

5. A method according to claim 1 characterized in that said mold acylase is selected from the group consisting of *Aspergillus oryzae* and *Penicillium vinaceum*.

6. A method according to claim 1 characterized in that said anion-exchange polysaccharide adsorbent is diethylaminoethyl-dextran.

7. A method according to claim 1 characterized in that said anion-exchange polysaccharide adsorbent is diethylaminoethyl-cellulose.

References Cited

UNITED STATES PATENTS

| 2,717,852 | 9/1955 | Stone | 195—63 X |
| 3,126,324 | 3/1964 | Mitz et al. | 195—63 |
| 3,167,485 | 1/1965 | Katchalski et al. | 195—63 |
| 3,243,356 | 3/1966 | Kirimura et al. | 195—63 |
| 3,252,948 | 5/1966 | Manecke | 195—63 X |
| 3,282,702 | 11/1966 | Schreiner | 195—63 X |
| 3,278,392 | 10/1966 | Patchornik | 195—63 |

FOREIGN PATENTS 659,059  3/1963  Canada.

LIONEL M. SHAPIRO, *Primary Examiner.*

A. LOUIS MONACELL, *Examiner.*